United States Patent

[11] 3,596,189

| [72] | Inventor | Frank K. Luteran<br>1848 N. Walmont Drive, Jackson, Mich. 49203 |
|---|---|---|
| [21] | Appl No | 800,188 |
| [22] | Filed | Feb. 18, 1969 |
| [45] | Patented | July 27, 1971 |

[54] NON-CONTACT SHAFT SYNCHRONIZER
12 Claims, 6 Drawing Figs.

[52] U.S. Cl.............................................. 328/72,
307/252 N, 307/278, 307/309, 318/653, 318/656, 324/70
[51] Int. Cl..................................................... H03k 17/00, G01p 3/12
[50] Field of Search.......................................... 307/278, 309, 252 N; 328/72; 324/70, 74, 45; 310/26, 79; 318/653, 656

[56] References Cited
UNITED STATES PATENTS

| 2,556,471 | 6/1951 | Elam | 324/174 |
|---|---|---|---|
| 2,798,976 | 7/1957 | Eckel | 324/174 |
| 3,317,829 | 5/1967 | Kuhrt | 324/70 |

FOREIGN PATENTS

| 1,377,236 | 12/1962 | France | 324/174 |
|---|---|---|---|
| 403,080 | 9/1963 | Switzerland | 324/174 |

Primary Examiner—Donald D. Forrer
Assistant Examiner—David M. Carter

ABSTRACT: This invention relates to a noncontacting shaft position indicator utilizing the responsive properties of a magnetosensitive device. Shaft position is determined from the variation of the intensity and direction of the magnetic flux linking a rotor on the shaft and a fixed stator. The varying magnetic flux phase and amplitude modulates the high frequency input signal of a magnetosensitive device interposed in the flux path. The phase modulation information is utilized to generate a trigger pulse which is in synchronism with the instantaneous shaft position. Electrical means are provided to further shape the magnetic field to provide a means of retarding or advancing the generation of the trigger pulse in relation to the instantaneous shaft position.

PATENTED JUL 27 1971 3,596,189

INVENTOR
Frank K. Lutuan

SIGNAL AT 48, 64

SIGNAL AT 52, 62

SIGNAL AT 72

SIGNAL AT 80

NON-CONTACT SHAFT SYNCHRONIZER

BACKGROUND OF THE INVENTION

The instant invention is intended to provide a new and improved method of generating a synchronizing trigger pulse indicating the instantaneous position of a rotating shaft. Prior methods of synchronization which have used mechanical means suffer from wearing of component parts and speed limitations. Prior electrical synchronization systems using optical and magnetic means have also exhibited shortcomings. The optical system relies on reflection from the rotating shaft and is severely affected by any foreign material such as lubricating oil that may coat the reflective surface. Prior magnetic systems being of the inductive type utilizing a pickup coil although functioning satisfactorily to indicate the number of shaft resolutions have required extensive electronic circuitry to produce a synchronizing pulse in known relation to the instantaneous shaft position.

SUMMARY OF THE INVENTION

The instant invention is intended to obviate the above described drawback of prior synchronization devices, and has for its first object to provide a contactless synchronization device in which new and improved position detecting means using a magnetosensitive elements are provided. The magnetosensitive device develops a definite output irrespective of the rotational speed of the shaft.

For this purpose the magnetosensitive element is disposed in a magnetic field rotating in association with the revolution of the shaft and is arranged such that the magnetic flux, in conjunction with the high frequency control current produces a phase modulated signal that determines the time of production of the synchronous trigger pulse.

Another object of the instant invention is to provide a contactless synchronization device in which a rotating magnetic field is additionally varied by adjusting the current through a plurality of magnetic coils. By this arrangement, the generation of the synchronizing trigger pulse can be advanced or retarded in relation to the instantaneous shaft position.

A further object of the invention is to provide a contactless synchronization device in which the input terminals of the magnetosensitive element are connected to a source of high frequency current. The high frequency current when modified by the magnetic flux transversing the element producing an output signal which is both amplitude and phase modulated.

According to the invention, there is provided a contactless synchronizing device in which the amplitude and phase modulated high frequency output voltage of the magnetosensitive element is connected to means which detect when the phase of said high frequency signal is out of phase with the high frequency input current of the magnetosensitive element. In this arrangement the phase detector producing a change in voltage level whenever the out-of-phase condition occurs. Said out-of-phase condition occurring at a predetermined position of the rotating shaft.

According to a further feature of the invention, there is provided a contactless synchronization device of above character, in which sad magnetosensitive element in said synchronizing means is held between supporting means in a manner such that a closed magnetic circuit is formed therethrough will pole pieces provided in a rotor mounted on the shaft and the flux generating coils. An additional object of the invention is to provide a contactless synchronization device in which AC coupling is used to effect signal transfer to the input and from the output of the magnetosensitive device, thereby eliminating the dependence of the circuits on temperature dependent DC voltage levels.

Another object of the invention is to provide a contactless synchronization device in which various types of magnetosensitive devices may be interchangeably used. The types being the magnetodiode as produced by SONY Corporation which functions on the principle of controlled lifetime of injected carriers by an external magnetic field; the Hall effect device which operates on the principle of the deflection of carriers to one edge of the crystal by the magnetic field, thereby resulting in a unequal charge distribution across the crystal; the magnetoresistance device in which semiconductor resistance is controlled by the effect of the magnetic field on carrier mobility.

Further objects and advantages of the instant invention will be apparent from the following description, reference being made to the accompanying drawings wherein preferred embodiments of the instant invention are clearly shown.

IN THE DRAWINGS

Figure 1:
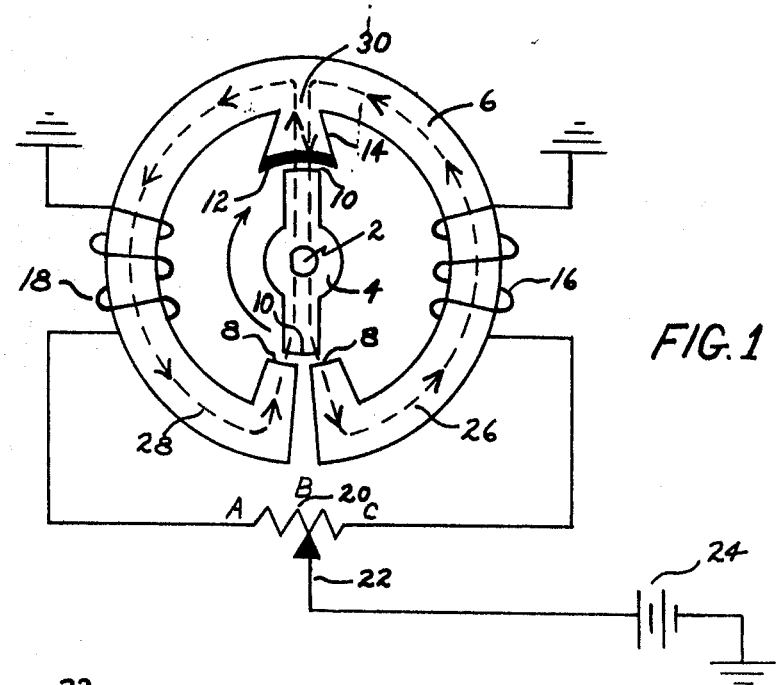
FIG. 1 is a schematic circuit diagram of the magnetic field structure of this invention.

Referring now to the drawings and more particularly to FIG. 1, the reference numeral 2 designates a rotating shaft, the exact instantaneous position of which is to be determined. Rotor 4 is rigidly attached to shaft 2 with symmetrical lobes 10 arranged concentrically within the air gap described by singular pole 14 and pole pairs 8 of stator 6. Magnetosensitive element 12 is attached to the face of pole 14 in radial alignment with rotor 4 and stator 6.

Stator 6, constructed of magnetically permeable material, in conjunction with energized left and right coils 16 and 18 produced a net flux 30 through magnetosensitive element 12, the strength and direction of the flux being dependent on rotor 4 position and the electrical current through coils 16 and 18. Energization of coils 16 and 18 is dependent on the position of wiper arm 22 of potentiometer 20 and the voltage of battery 24.

In the case of equal energization of coils 16 and 18 which occurs when wiper arm 22 is at position B as illustrated, flux 28 produced by left coil 18 will equal flux 26 produced by right coil 16 when rotor 4 is symmetrically aligned with pole pair 8 as illustrated resulting in a net flux 30 of zero across magnetosensitive element 12. Counterclockwise displacement of rotor 4 will result in net flux 30 being in a downward direction as determined by the strength of flux 26. Clockwise displacement of rotor 4 from the zero net flux position will result in net flux 30 being in an upward direction as det :r- mined by the strength of flux 28.

Clockwise or counterclockwise rotational displacement of greater than 20 degrees from the illustrated position results in negligible net flux 30 across magnetosensitive element 12.

Figure 2:
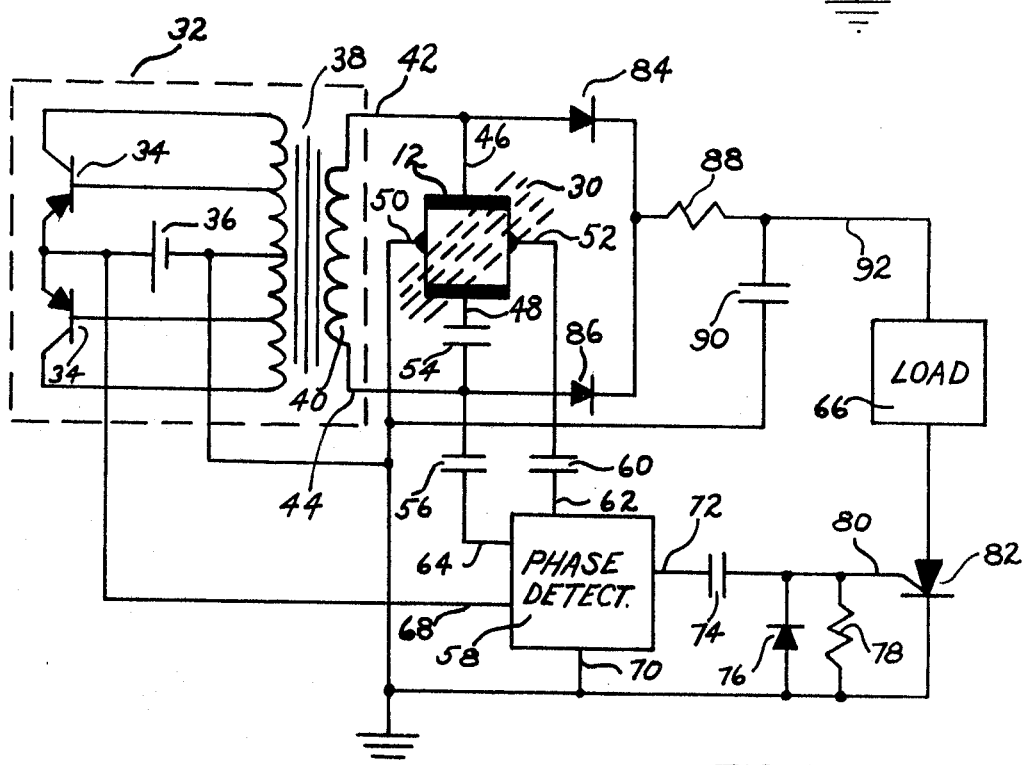
FIG. 2 is a schematic circuit diagram of the signal detection and processing section of the synchronization system.

The result of rotor 4 rotation within stator 6 is therefore to produce a change in next flux 30 direction and strength resulting in two sharply defined null points each revolution occurring at the illustrated position of the rotor and 180° rotation therefrom. Said null points being defined by a rapid change in signal amplitude from maximum through null to maximum accompanied by a 180° change in flux direction upon transition through the null. Transition through the flux null point provides the necessary signal to the electrical detection and processing circuitry as illustrated in FIG. 2 to provide the desired synchronization signal. The illustrated magnetic circuitry produces a null for each lobe 10 of rotor 4 for each shaft 2 revolution. The two lobed rotor therefore causes two synchronization pulses to be generated for each shaft revolution. Further, a rotor of multiple lobe pairs may be utilized in the circuit of FIG. 1 to generate multiple synchronization signals.

In FIG. 2, DC-AC converter 32 consisting of transistors 34, transformer 38 and battery 36 supplies a high frequency control signal from transformer secondary winding 40 via lead 42 to the direct coupled input lead 46 of the magnetosensitive element 12 herein depicted as a Hall device. The second control signal to magnetosensitive element 12 is provided by secondary winding 40 via lead 44 through capacitor 44 to AC coupled input lead 48. Secondary winding 40 is also connected via lead 42 to rectifier 84 and via lead 44 to rectifier 86. The cathode side of rectifier 84 and 86 are connected through limit resistor 88 to storage capacitor 90. The combination of rectifiers 84, 86, limit resistor 88 and storage capacitor 90 being to produce a source of DC electrical energy from the high frequency signal generated across secondary winding 40. One output of magnetosensitive element 12 is connected to the system common ground point via lead 50. The other output is connected via lead 52 through coupling capacitor 60 to signal input lead 62 of phase detector 58. The output of secondary winding 40 is connected via lead 44 through coupling capacitor 56 to reference input 64 of phase detector 58. Power is provided to phase detector 58 by battery 36 via lead 68. A common ground point is provided the phase detector via lead 70.

The operation of phase detector 58 is well known by those practicing the art and may be digital or analog in nature.

The discharge of storage capacitor 90 to a minimum level causes controlled rectifier 82 to switch to the nonconductive state, thereby deenergizing load 66 and resetting the circuit until generation of the next trigger pulse at the gate of the controlled rectifier.

Figure 3:
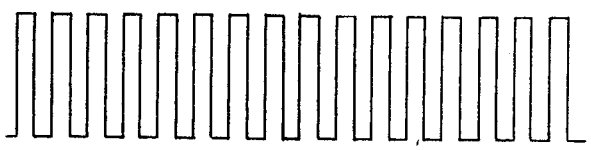
FIG. 3 illustrates the curves of signal voltages appearing at different points of the system illustrated in FIG. 2.
Figure 3:
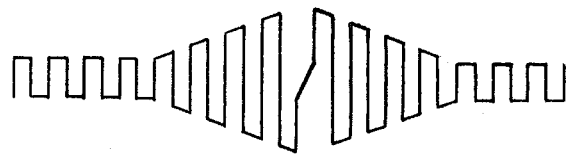

The action of net flux 30 in modifying the phase and amplitude of the control signal of magnetosensitive element 12 when the magnetosensitive element is a Hall device is known to be dependent on the amplitude, direction and angle of the flux impinging on the Hall element. Net flux 30 modifies the control signal illustrated in FIG. 3 as the signal at 48, 64 in a manner to amplitude modulate the control signal in relation to flux angle and amplitude and phase modulate the control signal in relation to the flux direction. The resultant magnetosensitive output signal is illustrated in FIG. 3 as the signal at 52, 62 for rotor rotation through an angle of approximately 40° of pole 14.

The output 72 of phase detector 58 is a DC voltage the level of which is dependent on the instantaneous phase relation between reference input 64 and signal input 62. These signals will be in 0° or 180° phase dependent on net flux 30 impinging on magnetosensitive element 12. Phase detector output 72 is connected through differentiating capacitor 74 to negative clamping diode 76 and differentiating resistor 78 and via lead 80 to the gate input of controlled rectifier 82. The anode of controlled rectifier 82 is serially connected through lead 66 and lead 92 to storage capacitor 90. The combination of differentiating capacitor 74, clamping diode 76 and differentiating resistor 78 being to produce a positive voltage pulse at the gate of controlled rectifier 82 when phase detector output 72 instantaneously changes to a more positive DC voltage level.

A positive pulse at the gate of controlled rectifier 82 causes the rectifier to conduct, thereby causing a large current to flow from storage capacitor 90 through load 66. Load 66 may be any circuit or device which is intended to be activated at the synchronization point. The output 72 of the phase detector in relation to the magnetosensitive element output signal and the input to the gate 80 of the controlled rectifier are illustrated in FIG. 3.

The embodiment of a Hall device as magnetosensitive element 12 does not limit the instant invention to utilize only Hall devices.

Figure 4:
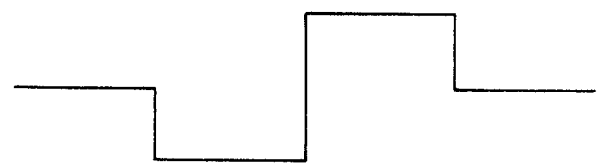
FIG. 4 is a schematic circuit of an alternate magnetosensitive circuit that can be substituted in the system illustrated in FIG. 2.
Figure 4:
Figure 4:
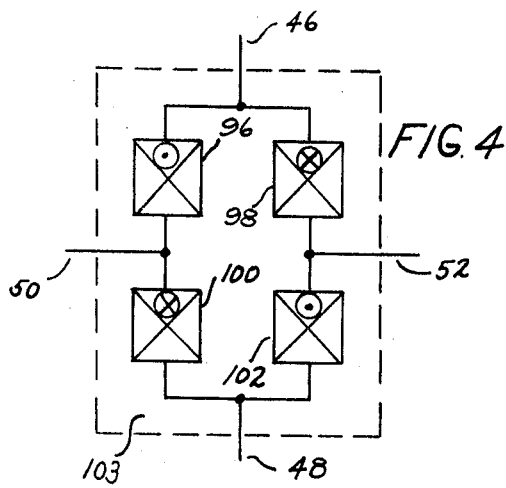

FIG. 4 illustrates an equivalent circuit that can be substituted for the Hall device. Circuit 103 of FIG. 4 consists of a series parallel arrangement of magnetosensitive elements 96, 98, 100, 102. The magnetosensitive elements are asymmetrical. The operation of the asymmetrical magnetoresistor is to decrease resistance in a linear manner in relation to the strength and direction of the magnetic flux impinging on the element. The reversal of magnetic flux direction does not change the resistance value.

Magetoresistors 96 and 100 are series connected and mechanically oriented on pole 14 in opposite flux sensitive directions. Magnetoresistors 98 and 102 are series connected in opposed relation to magnetoresistors 96 and 100 and mechanically oriented on pole 14 in opposite flux sensitive directions. The sensitivity of elements 96 and 100 are selected to be greater than the sensitivity of elements 98 and 102 thereby resulting in a voltage change at outputs 50 and 52 dependent on the magnitude and direction of the impinging magnetic flux in a manner identical to that of the aforementioned Hall device. It is permissible to substitute fixed resistances for elements 98 and 102 and achieve a similar output signal, however the effect of temperature dependent characteristics of elements 96 and 100 are better compensated for by using magnetosensitive device.

Figure 5:
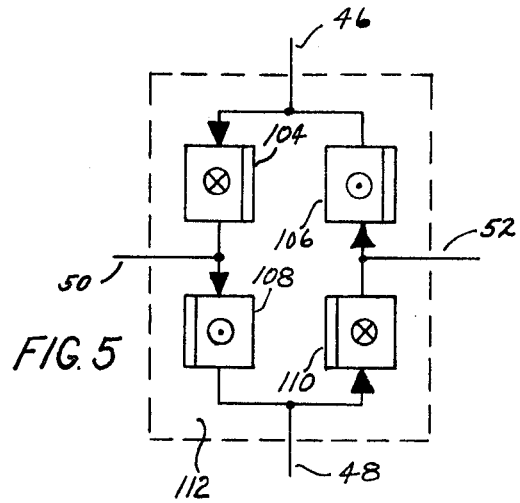
FIG. 5 is a schematic circuit of another alternate magnetosensitive circuit that can be substituted in the system illustrated in FIG. 2.

Another equivalent circuit for the Hall element is circuit 112 illustrated in FIG. 5. Circuit 112 is composed of four magnetodiodes 104, 106, 108 and 110 connected in series parallel circuit.

Magnetodiodes 104 and 108 are series connected and mechanically oriented on pole 14 in opposite magnetic flux sensitive directions. Magnetodiodes 106 and 110 are series connected in opposed voltage polarity to magnetodiode 104 and 108 and mechanically oriented on pole 14 in opposite magnetic flux sensitive directions. The change in voltage output at 50 and 52 of circuit 112 is dependent on the magnitude and direction of the impinging magnetic flux in a manner identical to that of the aforementioned Hall device.

Figure 6:
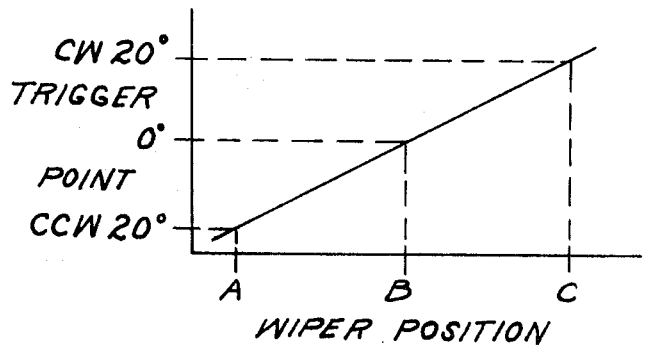
FIG. 6 illustrates the curve of synchronization pulse displacement as a function of the magnetic field excitation illustrated in FIG. 1.

The operation of the advance-retard feature of the synchronization trigger point can be explained by showing the effect of moving potentiometer wiper arm 22 from the mid point B of potentiometer 20 illustrated in FIG. 1. With wiper arm 22 at the mid point B coils 16, 18 are equally energized and the null point for net flux 30 occurs when the rotor is symmetrically positioned between pole pairs 8. When arm 22 is moved toward A, coil 18 receives greater energization than coil 16, therefore the null point for flux 30 will occur when rotor 4 is displaced counterclockwise to the position shown in FIG. 1. Similarly when arm 22 is moved toward B, the flux null point and hence the synchronization trigger point will occur when the rotor is displaced in a clockwise direction. The relation between wiper arm 22 position and trigger point is illustrated in FIG. 6.

The application of the invention requires the rotor to be affixed to a rotating shaft and the stator affixed to a nonrotating member.

The approximate point at which a shaft synchronization trigger is desired is obtained by setting the relative position of the rotor and stator. The exact synchronization trigger point may then be set more precisely by electrical adjustment of retard or advance. The resultant trigger point will remain constant regardless of the rotor angular speed.

Having described embodiments of a new and improved contactless synchronization system, other variations and adaptations of the ignition device will be suggested to those skilled in the art in the light of the above teachings. It is therefore to be understood that any such changes or modifications in the particular embodiments of the invention described are considered to fall within the scope of the invention as defined by the appended claims.

I claim:

1. A synchronization system for determining the instantaneous position of a rotating shaft comprising in combination.
   a. A magnetic permeable rotor affixed to a rotating shaft;
   b. A magnetic permeable stator with a plurality of pole pieces concentrically positioned about said rotor;
   c. Energization coils wound on said stator producing a magnetic flux upon energization thereof;

d. Electrical energy source providing energization of said coils;
e. A magnetosensitive element attached to a pole piece of said stator and disposed in said magnetic flux; said element having control input leads and output signal leads, generating an output signal of the same frequency as the control input signal, phase and amplitude modulated in accordance with the amplitude and direction of the instantaneous value of said magnetic flux;
f. A power source producing a high frequency voltage;
g. AC coupling means from said power source to said control input leads;
h. Rectifier and filter means connected to said power source, converting said high frequency voltage to DC energy;
i. A storage capacitor for storing said DC energy;
j. AC coupling means of said magnetosensitive output signal to the first input of a phase detector;
k. AC coupling means from said power source to the second input of said phase detector;
l. A phase detector responsive to the difference in phase between the first and second input signals, producing a constant predetermined voltage output for an inphase relationship and a different constant predetermined voltage for an out-of-phase relationship;
m. Circuit means for differentiating and clamping the phase detector output signal to produce a positive trigger pulse coincident with a change in phase in said phase detector;
n. A controlled rectifier actuated by said positive trigger;
0. A load connected between said controlled rectifier and said energy storage capacitor.

2. A synchronization system according to claim 1 wherein said magnetic permeable rotor includes a plurality of uniformly, angularly spaced lobe pairs the number of which bears a direct relation to the number of synchronization pulses generated per revolution of the shaft to which said rotor is affixed thereto.

3. A synchronization system according to claim 2 wherein said magnetic permeable stator comprising a noncontiguous circular member with a pair of poles at each end of the discontinuity, said poles symmetrically aligned about the center line of said stator, a third pole opposite said pole pairs symmetrically aligned about said center line.

4. A synchronization system according to claim 3 wherein said energization coils are independently energized by an AC voltage source.

5. A synchronization system according to claim 4 wherein said energization coils are independently energized by an AC voltage superimposed on a DC bias voltage.

6. A synchronization system according to claim 5 wherein said energization coils are serially energized by a voltage source.

7. A synchronization system according to claim 6 wherein said magnetosensitive element is a Hall effect device and the equivalent thereof comprised of a circuit combination of asymmetrical magnetoresistors and magnetodiodes.

8. A synchronization system according to claim 7 wherein said phase detector is nonresponsive to variations in amplitude of the input signals.

9. A synchronization system according to claim 8 wherein said load is an inductive device which in combination with said capacitor comprises a resonant circuit, said circuit causing a reversal of the initial current flow through said controlled rectifier thereby causing said controlled rectifier to return to a nonconductive state after a half cycle of current flow.

10. A synchronization system according to claim 9 wherein said high frequency power source comprises a pair of transistors and a multitap step up transformer connected in DC converter configuration.

11. A synchronization system for determining the instantaneous position of a rotating shaft comprising in combination:
a. magnetic permeable stator and rotor, said rotor affixed to the rotating shaft and said stator affixed to a nonrotating member in coaxial relationship to said rotor,
b. magnetic means for producing at least two magnetic circuits in the stator rotor combination, the common flux flowing through said rotor-stator combination being a function of the instantaneous rotor position and independent of said rotor rotational speed said common flux reversing direction during rotation through each rotor-stator symmetry point;
c. magnetosensitive element disposed in said common flux responsive to the instantaneous amplitude and direction of said flux and producing a voltage level output dependent on said flux amplitude and a voltage polarity dependent on said flux direction
d. detector circuit means generating an instantaneous voltage step whenever said magnetosensitive element output signal traverses from a maximum positive voltage level to a maximum negative voltage level.

12. A synchronization system according to claim 11 wherein said rotor comprised of at least two poles and said stator comprised of at least three poles.